United States Patent
Lewis

(10) Patent No.: US 9,452,353 B2
(45) Date of Patent: Sep. 27, 2016

(54) GAME CARD INCLUDING PAYMENT IDENTIFIER

(71) Applicant: Visa International Service Association, San Francisco, CA (US)

(72) Inventor: Robert Lewis, Los Gatos, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 207 days.

(21) Appl. No.: 14/075,977

(22) Filed: Nov. 8, 2013

(65) Prior Publication Data

US 2014/0194187 A1  Jul. 10, 2014

Related U.S. Application Data

(60) Provisional application No. 61/723,963, filed on Nov. 8, 2012.

(51) Int. Cl.
| | |
|---|---|
| *G07F 17/32* | (2006.01) |
| *A63F 13/30* | (2014.01) |
| *A63F 13/792* | (2014.01) |
| *G06Q 20/28* | (2012.01) |
| *G06Q 20/34* | (2012.01) |

(52) U.S. Cl.
CPC ............ *A63F 13/12* (2013.01); *A63F 13/792* (2014.09); *G06Q 20/28* (2013.01); *G06Q 20/347* (2013.01); *A63F 2300/205* (2013.01)

(58) Field of Classification Search
CPC ...................................................... G07F 17/32
See application file for complete search history.

(56) References Cited

U.S. PATENT DOCUMENTS

| | | | |
|---|---|---|---|
| 8,162,226 B2 | 4/2012 | Winters | |
| 8,469,805 B2 | 6/2013 | Kilgore et al. | |
| 8,550,359 B2 | 10/2013 | Winters | |
| 2003/0003983 A1* | 1/2003 | Walker | G06Q 30/0209 463/16 |
| 2003/0120930 A1 | 6/2003 | Simpson et al. | |
| 2006/0068898 A1 | 3/2006 | Maya | |
| 2006/0273157 A1* | 12/2006 | Behm | A23J 1/14 235/380 |
| 2007/0246526 A1 | 10/2007 | Elgar et al. | |
| 2008/0070690 A1 | 3/2008 | Van Luchene et al. | |
| 2008/0220876 A1 | 9/2008 | Mehta et al. | |
| 2009/0176577 A1 | 7/2009 | Ho | |
| 2012/0185377 A1 | 7/2012 | Winters | |
| 2013/0132202 A1 | 5/2013 | Gordon et al. | |

* cited by examiner

*Primary Examiner* — Omkar Deodhar

(74) *Attorney, Agent, or Firm* — Kilpatrick Townsend & Stockton

(57) ABSTRACT

A payment card is disclosed. The payment card may comprise a substrate, and an issuer identifier, and a game code printed on the substrate. The payment card may be a stored value card or a gift card, and can be used in an open loop payment system. A removable layer can be present over the game code.

19 Claims, 8 Drawing Sheets

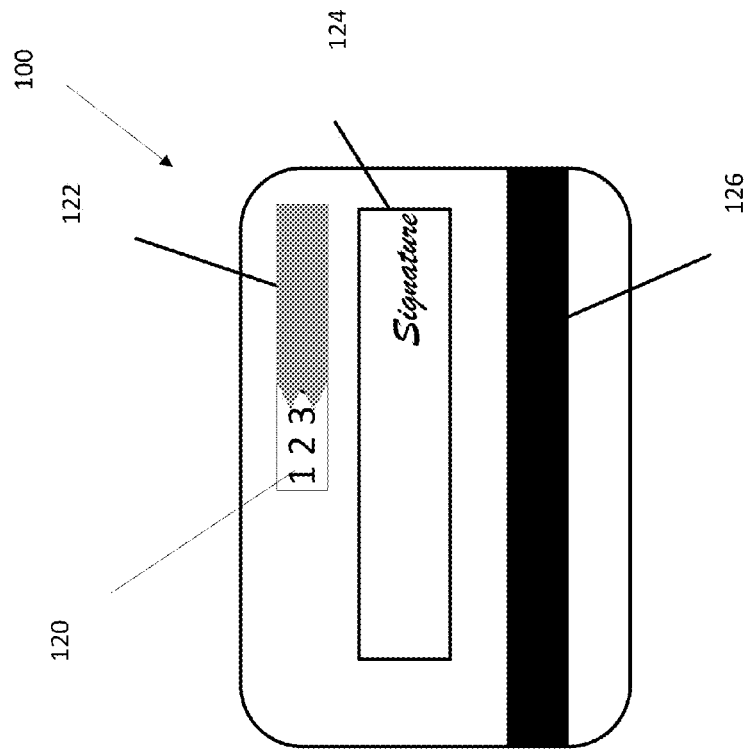
FIG. 1B
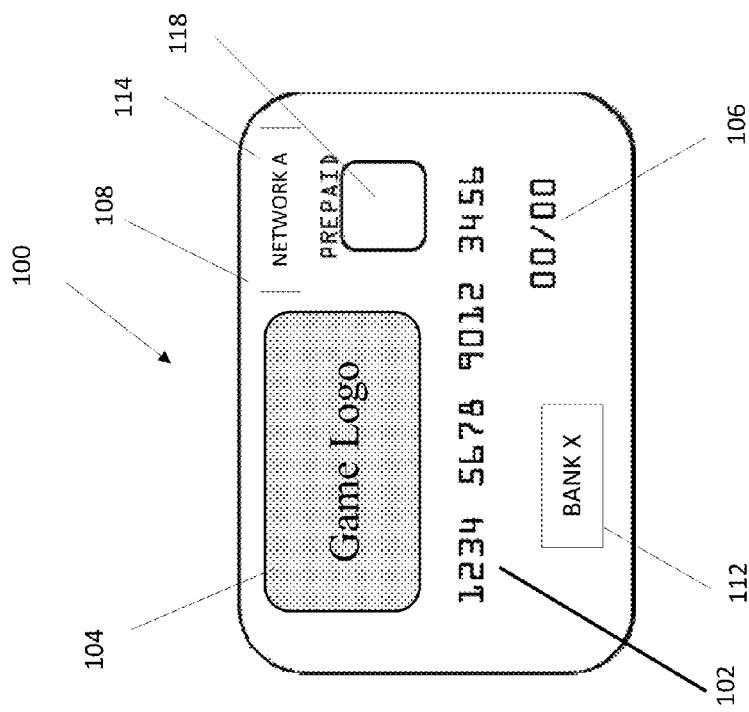
FIG. 1A
FIG. 1

GAME CARD INCLUDING PAYMENT IDENTIFIER

CROSS-REFERENCES TO RELATED APPLICATIONS

This application is a non-provisional of and claims the benefit of the filing date of U.S. provisional application No. 61/723,963, filed on Nov. 8, 2012, which is herein incorporated by reference in its entirety for all purposes.

BACKGROUND

Game cards are typically devices with a printed game code. The game code can be entered into a virtual game to purchase a particular game element (e.g., an amount of a games' virtual currency) in a game or to purchase game time.

Game cards have, however, limited usefulness. Once a game card PIN (personal identification number) is used, the game card is simply discarded. Further, if the game card is given as a gift, the game card may have limited usefulness, because the recipient must play the game associated with the game card to get any benefit from the game card.

Embodiments of the invention address these and other problems.

BRIEF SUMMARY

Embodiments of the present invention relate to systems and methods for associating a game code with a financial account identifier that represents a financial account.

One embodiment of the invention is directed to a portable consumer device comprising a substrate and a financial account identifier on the substrate. The financial account identifier is from an issuer. The substrate may also have a game code on the substrate. The game code represents a value in a video game.

One embodiment of the invention is directed to a method comprising receiving a portable consumer device. The portable consumer device comprises a substrate, a financial account identifier on the substrate, and a game code on the substrate. The financial account identifier is from an issuer and the game code represents a value in a video game. The method also comprises selecting one or more goods and/or services for purchase, and then providing the financial account identifier to a merchant for purchasing the one or more goods and/or services. The method also comprises receiving the one or more goods and/or services after providing the financial account identifier. The method also comprises providing the game code to a game server, and then receiving a game element.

One embodiment of the invention is directed to a method comprising receiving a request from a user to purchase a game element. The method also comprises prompting the user to provide payment information and receiving a financial account identifier from the user. The method also comprises sending an authorization request message to an issuer. The authorization request message comprises transaction information and the financial account identifier. The method also comprises receiving an authorization response message from an issuer and identifying a game code corresponding to the financial account identifier at an account link database. The method also comprises sending a message to a game server. The message comprises the identified game code and information about the purchased game element. The game code is stored at the game server, and the game server associates the game code with a game user account. The game server attributes the purchased game element to the game user account.

One embodiment of the invention is directing to a server computer comprising a processor and a non-transitory computer readable medium coupled to the processor. The non-transitory computer readable medium comprises code executable by the processor for implementing a method comprising receiving a request from a user to purchase a game element. The method also comprises prompting the user to provide payment information and receiving a financial account identifier from the user. The method also comprises sending an authorization request message to an issuer. The authorization request message comprises transaction information and the financial account identifier. The method also comprises receiving an authorization response message from an issuer and identifying a game code corresponding to the financial account identifier at an account link database. The method also comprises sending a message to a game server. The message comprises the identified game code and information about the purchased game element. The game code is stored at the game server, and the game server associates the game code with a game user account. The game server attributes the purchased game element to the game user account.

These and the other embodiments of the invention are discussed in further detail below.

BRIEF DESCRIPTION OF THE DRAWINGS

FIGS. 1A and 1B respectively illustrate front and back views of a payment card.

DETAILED DESCRIPTION

Figure 2:
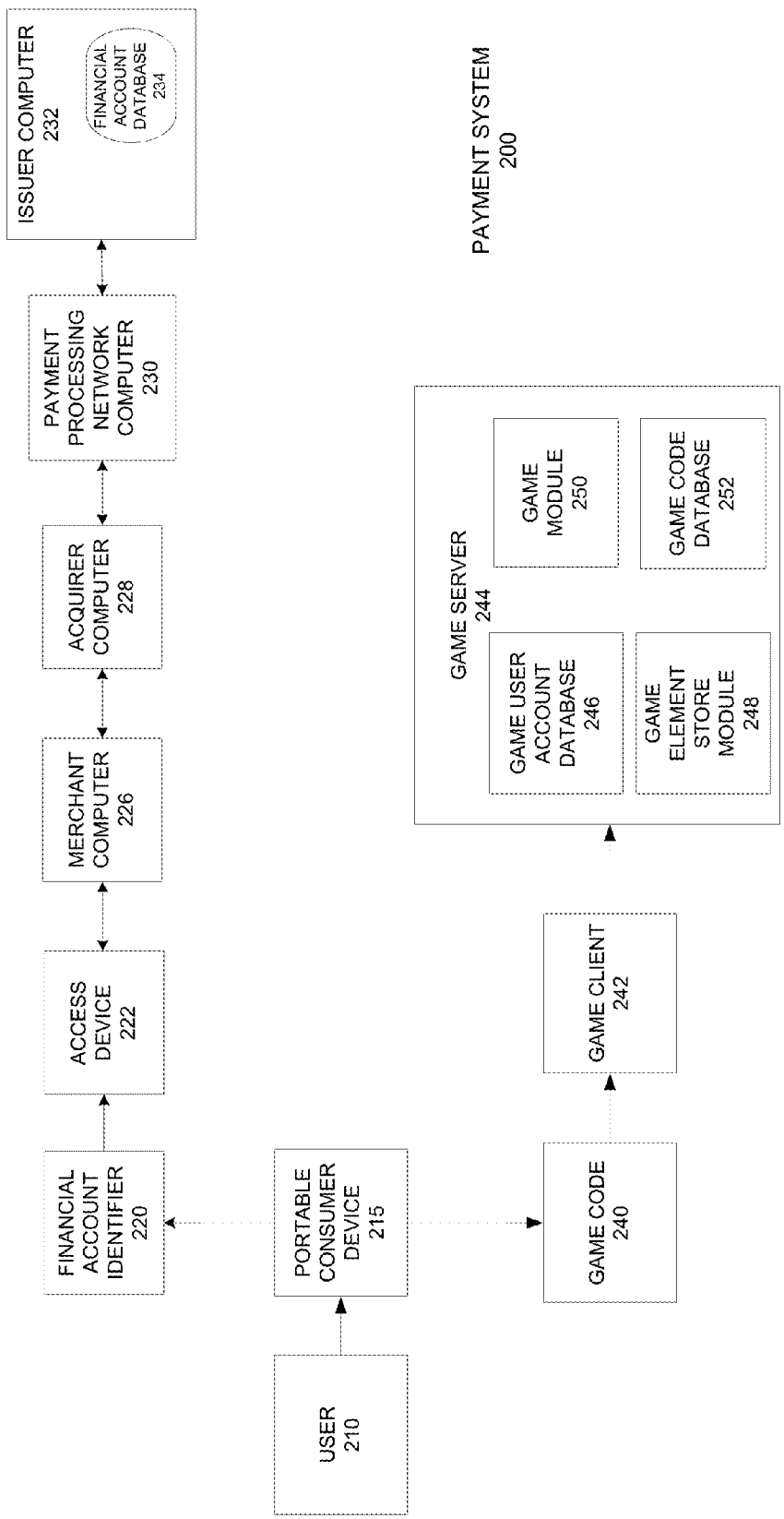
FIG. 2 is a block diagram of a system according to an embodiment of the invention.

Prior to discussing embodiments of the invention, some descriptions of some terms may be helpful in understanding embodiments of the invention.

A "substrate" may include a layer of material. The layer may comprise plastic, metal, or other material on which information can be stored. In some embodiments, a substrate can be implemented as a portable consumer device.

A "portable consumer device" may include any suitable physical device that can be used to conduct a payment. A portable consumer device may be in the form of a debit card, credit card, or stored value card. Suitable portable consumer devices can be hand-held and compact so that they can fit into a consumer's wallet and/or pocket (e.g., pocket-sized). Such devices can operate in either a contact or contactless mode.

A "financial account identifier" may include an identifier that associates a portable consumer device with a particular financial account. A financial account may be associated with, for example, a credit card, debit card, gift card, or transit card. In some embodiments, a financial account identifier may include a primary account number (PAN) and optionally other information (e.g., a CVV2 value) associated with a credit, debit, or prepaid account.

A "game code" may include a plurality of characters that may be associated with a game. A game code may be printed, embedded, or stored on a game card, printed on game card packaging, etc.

An "electronic game" may be any suitable game that can be played using an electronic medium. Examples of electronic games can include video games as well as games that do not require video.

A "game element" may be a feature or an object of value in or usable with a video or virtual game. In one embodiment, a game element may be a currency having a monetary value. In another embodiment, the game element may be a virtual item in a game, such as a weapon or potion. The currency may take the form of real-world currency, virtual currency or in-game currency that is distinct from real-world currency, game credit that can be used to purchase game entities, or take any other suitable form. In another embodiment, a game element may represent additional game playtime or a game subscription time.

"Virtual currency" may refer a medium of exchange usable in a virtual environment. Virtual currency may include any suitable digital currency in any suitable form. Examples of virtual currency may include points, electronic coins (e.g., game currency such as gold coins or gold, peer-to-peer digital currency such as Bitcoin, etc.) and electronic dollars. Many virtual currencies cannot be used outside of a particular gaming environment, although other virtual currencies may be usable outside of a particular gaming environment.

A "game credit" may include a value that may be associated with a game. A game credit may be used to purchase a game element. A game credit may be capable for purchasing game elements from one or more games on one or more game servers. In some embodiments, a game credit can be used within a game. In other embodiments, a game credit can only be used outside of a game for purchasing game elements. In other embodiments, game credit can be used both within a game and outside of game.

A "game user account" may include an account that is used by a user in a game. A game user account may comprise one or more game avatars, one or more game element inventories, and one or more records of game status. A game user account may be stored in a game user account database located at a game server, or it may be stored at a client computer. In some embodiments, a game user account may be stored completely or partially at both a game server and a client computer.

A "game element inventory" may include a record of one or more game elements. A game element inventory may be associated with a game user account, and may store information about game elements possessed by a game user. In some embodiments, a game element inventory is a database comprising information about one or more game user accounts and one or more game elements associated with one or more of the game user accounts.

An "issuer" is typically a business entity (e.g., a bank) which maintains financial accounts for a consumer and often issues a portable device such as a credit or debit card to the consumer.

A "merchant" is typically an entity that engages in transactions and can sell goods or services.

An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

A "payment processing network" may include a computer system that processes payments between merchants and issuers. It may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. A payment processing network computer may include a server computer. A payment processing network computer may use any suitable wired or wireless network, including the Internet.

A payment processing network may be disposed between the acquirer computer and the issuer computer. Furthermore, the merchant computer, the acquirer computer, the payment processing network, and the issuer computer may all be in operative communication with each other (i.e. one or more communication channels may exist between each of the entities, whether or not these channels are used in conducting a financial transaction).

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include any suitable computer that can provide communications to other computers and receive communications from other computers. A server computer may include a computer or cluster of computers. For example, the server computer can be a mainframe, a minicomputer cluster, or a group of servers functioning as a unit. In one example, a server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

Embodiments of the present invention provide for systems and methods for providing and utilizing a portable consumer device with a financial account identifier and a game code for a game. The portable consumer device may further include a cardholder signature, a magnetic stripe and/or a contactless element, a game design or logo, an expiration date, and any other suitable information. The game code may be printed on a substrate and may be occluded by a removable layer that is on the substrate. The removable layer may be removed by the user after the user purchases the portable consumer device.

Embodiments of the invention provide multiple advantages. For example, by providing a game code on a portable consumer device that can be used as an open loop payment device, the payment device is less cumbersome that conventional devices which would require two cards, one for a game card and one for an open loop payment card. Further, the portable consumer device according to embodiments of the invention can be more thoughtful gifts that have a greater degree of flexibility than traditional game cards. For example, by provide open loop payment functionality the portable consumer device, the portable consumer device can be used to pay for goods and services that are not affiliated with a specific game.

FIGS. 1A and 1B respectively show front and back views of a portable consumer device according to an embodiment of the invention. The portable consumer device in FIG. 1 is a physical card 100 that may comprise a substrate 108 that can be made of plastic or any other suitable material. The substrate 108 is generally rectangular in shape and may comprise a number of sublayers of material.

As shown in FIG. 1A, the front of the card 100 has a game design or graphic 104 which is associated with a particular game or game server. An issuer identifier 112 and a payment network identifier 114 may also be printed or present on the substrate 108 along with the game graphic 104. The game graphic 104 may include the name of the game and/or characters or icons associated with the game. The card 100 may also comprise a financial account identifier 102, which is typically a primary account number or PAN. A PAN typically contains 14, 16, or 19 digits. The card 100 may also comprise a hologram 118 as well as an expiration date 106 for the card 100.

As shown in FIG. 1B, the card 100 may also comprise a game code 120 on the back of the card 100. The game code 120 may be covered by a removable material 122 such as a "scratch off" material. A suitable scratch off material is an opaque metallic latex material. Other removable materials may include materials that may turn from opaque to transparent or translucent upon the application of some external stimuli (e.g., light). The removable material 122 may be adjacent to a paper or cardboard backing before the card 100 is purchased by a user, so that one cannot remove the removable material 122 before the card 100 is purchased by the user. The card 100 also comprises a signature panel 124 for the user's signature, and may also include a CVV2 value (not shown) as an authentication value for the card 100.

It is noted that other embodiments of the invention are also possible. For example, the game code 120 and the removable material 122 may be located on the front of the card 100 in other embodiments of the invention.

The card 100 also comprises a data storage medium in the form of a magnetic stripe 126. The magnetic stripe 126 can store the financial account identifier and other information. While the data storage medium in this example of a magnetic stripe, it may be in the form of a memory chip in other embodiments of the invention. A memory chip may be included in a contactless card, which can be an alternative type of card in another embodiment of the invention.

FIG. 2 shows a block diagram of an exemplary system according to an embodiment of the invention. The system 200 includes a user 210, a portable consumer device 215 along with a financial account identifier 220 and a game code 240 associated with the portable consumer device 215. The portable consumer device 215 may be used by a user 210.

The financial account identifier 220 may be used with an open loop payment network. An open loop payment network may be one in which allows a number of merchants to accept payment for a number of account issuers. Exemplary open networks may include a number of acquirer computers, a number of issuer computers, and payment processing networks that may act as switches to route transactions. This is in contrast to a close loop network where the issuer of a payment account is a merchant and the payment account can only be used at that merchant.

An exemplary open loop payment network may comprise a merchant computer 226 which may be in communication with an access device 222 (e.g., a POS or point of sale terminal).

The access device 222 according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. The access device 222 may utilize any suitable contact or contactless mode of operation.

The merchant computer 226 may also be in communication with an issuer computer 232 via an acquirer computer 228 and a payment processing network 230. The issuer computer 232 may store or maintain a financial account database 234, which stores the financial account identifier 220 for the portable consumer device 215 and other financial account identifiers for other portable consumer devices.

The game code 240 may be used with a game system, which may include a game client 242 and a game server 244. The game client 242 and the game server 244 may be in communication via any suitable communications network including the Internet. The game client 242 may be a communication device such as a personal computer, a mobile phone, a laptop computer, etc.

The game server 244 may include a game user account database 246, a game module 250, a game element store module 248, and a game code database 252. The game server 244 may also comprise a processor and a computer readable medium which stores code for the game user account database 246, game module 250, game element store module 248, and game code database 252.

The game user account database 246 may be associated with the game server 244, and may include one or more game user accounts. The user 210 may be associated with one or more game user accounts of the game user account database 246. A game user account may include information about game progress, a game character or game avatar, a game element inventory, or any other suitable information related to gameplay or game achievement.

The game element store module 248 may offer or sell game elements. The game element store module 248 may be associated with one or more game servers 244. The user 210 may be allowed to provide a game code 240 to the game element store module 248 in exchange for one or more game elements. The user 210 may further be allowed to browse game elements offered by the game element store module 248 and select one or more game elements for purchase.

The game module 250 may be operable to execute one or more games. The game module 250 may be associated with the game server 244. The user 210 may be allowed to access and interact with the game module 250 via the game client 242.

The game code database 252 may store information about one or more game codes 240. The game code database 252 may be associated with one or more game servers 244, and may store game codes 240 that may be redeemed by a game element store module 248. The game code database 252 may store one or more game elements, one or more games codes associated with or more game elements, one or more game elements associated with game value, a record of active and inactive game elements, etc.

Figure 4:
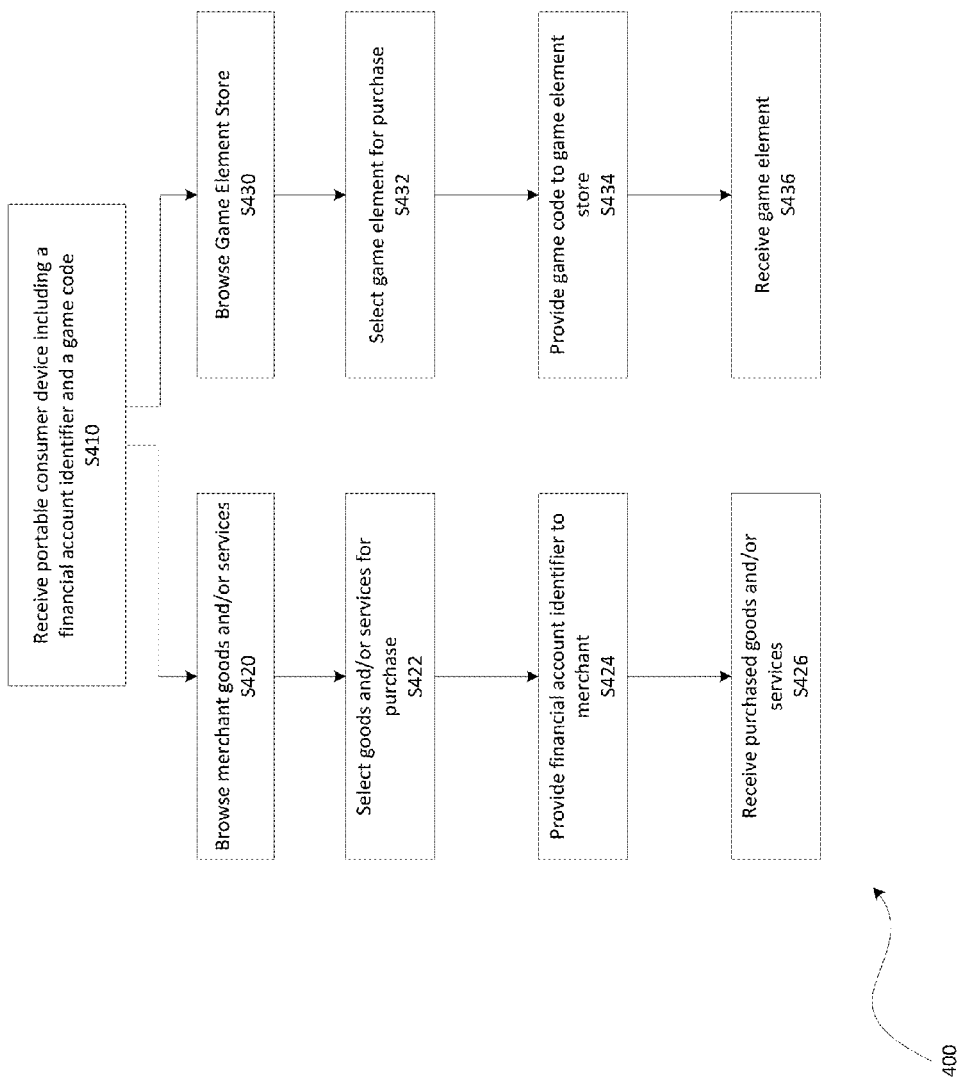
FIG. 4 illustrates an exemplary flow diagram, illustrating a method for using a portable consumer device to purchase a good and/or service by providing a financial account identifier, and to purchase a game element by providing a game code.

FIG. 4 shows a flowchart illustrating methods according to embodiments of the invention. In this discussion, reference can also be made to the system illustrated in FIG. 2.

The method 400 begins by the user 210 receiving the portable consumer device 215 in step S410. In various embodiments, the user may purchase the portable consumer device from a retail establishment, order it from a game developer or game publisher, order it from a financial institution, or receive it in any other suitable manner.

In a typical game code redemption use case, the user 210 may first launch an application on the game client 242. The game client 242 may optionally prompt the user 210 to log into a game server 244 with account credentials for a game user account that may be associated with the user 210. In some embodiments, the game code 240 may be usable for purchasing game elements or otherwise add value to a user account in the game server 244.

In step S430, the user 210 may browse a game element store that may be a part of a game element store module 248 associated with the game server 244. The game element store module 248 may sell, offer, or exchange one or more game elements that may be associated with one or more games of one or more game servers 244.

In step S432, the user 210 may then select one or more game elements that may be offered by the game element store module 248. The user 210 may indicate a desire to purchase the one or more game elements from the game element store module 248. The game element store module 248 may then prompt the user 210 to provide payment information.

In step S434, the user 210 may then provide payment information to the game element store module 248. The user 210 may provide the game code 240 to the game client 242 as payment information. The game client 242 may then provide the game code 240 to the game server 244.

Figure 3:
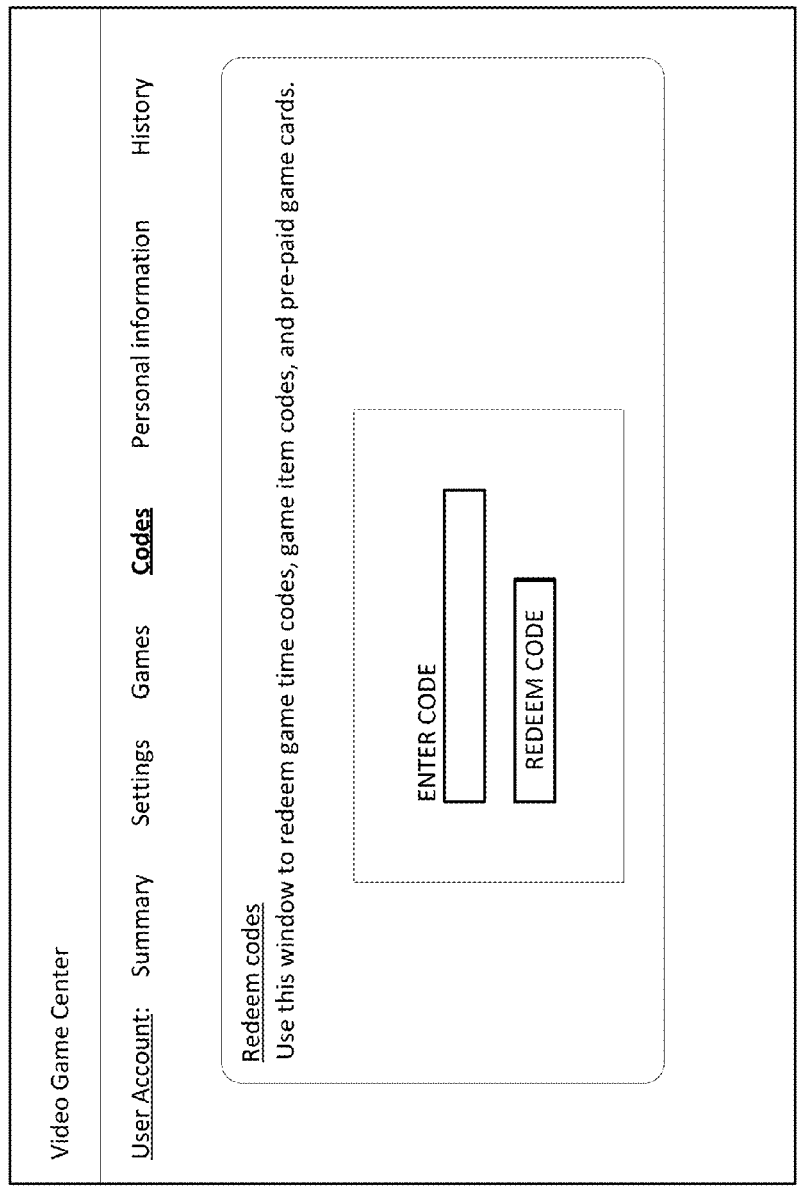
FIG. 3 illustrates a screenshot for allowing a user to enter a game code into a user interface for a game.

An exemplary window that may be displayed by the game client 242 when the user 210 is prompted to provide a game code 240 is shown in FIG. 3. As shown, the user 210 may input the game code 240 in order to redeem the code. The code may be redeemed in order to pay for game the one or more game elements selected in S432, or the code may be redeemed in exchange for one or more game elements that may already be associated with the game code 240.

In alternative embodiments, the game code 240 may be associated with one or more game elements. Instead of browsing the game element store as in step S430 and selecting one or more game elements for purchase as in step S432, the user 210 may indicate to the game client 242 a request to input a game code 240. The game client 242 may then prompt the user 210 for the game code 240. The user 210 may subsequently provide the game code to game client 242, as in step S434. The game client 242 may then forward the game code 240 to the game server 244.

The game server 244 may receive the game code 240, and the game server 244 may perform a lookup to determine a corresponding game element. In embodiments of the invention, the lookup may involve using the game code 240 to query a game code database 252. A game element may be determined using the game code, and one or more actions to be performed in order to associate the game element with the game user account of the user 210. For example, the user may receive the game element from the game element store module 248 (step S436).

The actions to be performed in order for the user to receive the game element may include, for example, associating ownership of a particular item corresponding to the game element to the user's character, adding a play-time amount corresponding to the retrieved game element to the user's game account, adding an amount of virtual money corresponding to the retrieved game element to the user's virtual bank account, adding an amount of game credit to the user's game element purchasing account, unlocking restricted game areas to the user, or attributing one or more game elements to the user 210 in any other suitable manner.

In a typical purchase transaction use case, the user 210 may purchase one or more goods or services at a merchant using the portable consumer device 215. In step S420, the user 210 may browse goods and/or services offered by the merchant. Then, in step S422, the user 210 may select one or more goods and/or services for purchase from the merchant. The user 210 may bring the one or more goods or services to a POS terminal, indicate a desire to check out at an online merchant, or otherwise communicate to the merchant a desire to make a purchase.

The merchant may then prompt the user 210 to provide payment information. In step S424, the user 210 may then provide the financial account identifier 215 to the merchant. The user's portable consumer device 215 can interact with an access device 222 such as a POS terminal at the merchant. For example, the user 210 may take the portable consumer device and may swipe it through an appropriate slot in the POS terminal. Alternatively, the POS terminal may be a contactless reader, and the portable consumer device 215 may be a contactless device such as a contactless card. In each such interaction, the portable consumer device 215 may provide the financial account identifier 220 to the access device 222.

The access device 222 may forward the financial account identifier 220 to the merchant computer 226 associated with the merchant. An authorization request message including the financial account identifier 220 may be generated by the access device 222 and may then be sent to the acquirer computer 228 by the access device 222 or the merchant computer 226. After receiving the authorization request message, the acquirer computer 228 may then send the authorization request message to the payment processing network computer 230. The payment processing network computer 230 may then forward the authorization request message to the issuer computer 232 associated with the issuer of the financial account represented by the financial account identifier 220 of the portable consumer device 215.

After the issuer computer 232 receives the authorization request message, the issuer computer 232 may send an authorization response message back to the payment processing network 230 to indicate whether or not the current transaction is authorized (or not authorized). The payment processing network computer 230 may forward the authorization response message back to the acquirer computer 228. The acquirer computer 228 may then send the response message back to the merchant computer 226.

After the merchant computer 226 receives the authorization response message, the access device 222 at the merchant may then provide the authorization response message for the user 210. The response message may be displayed by the POS terminal, or may be printed out on a receipt. Then, in step S426, the user 210 may receive the one or more purchased goods and/or services. The user 210 may receive them immediately, or at a later time.

In some embodiments, at the end of the day, a normal clearing and settlement process can be conducted by a transaction processing system. A clearing process is a process of exchanging financial details between an acquirer and an issuer to facilitate posting to a user's account and reconciliation of the user's settlement position. Clearing and settlement can occur simultaneously.

Figure 5:
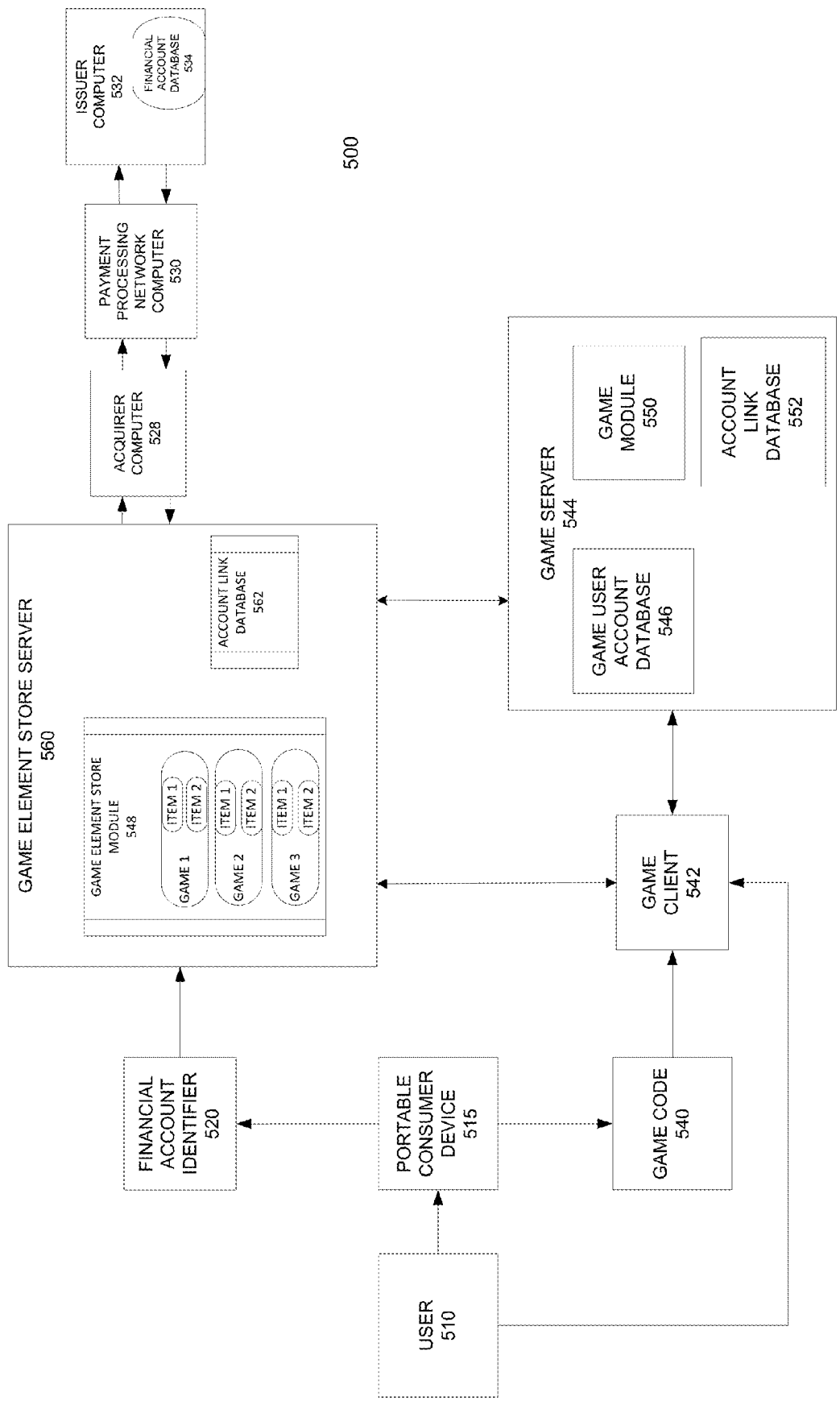
FIG. 5 is a block diagram of a system according to an embodiment of the invention.

FIG. 5 shows a block diagram of an exemplary system that may be used in embodiments of the invention. The system 500 can be used by a user 510, and includes a portable consumer device 515 with a financial account identifier 520 and a game code 540. The system 500 further comprises a payment processing network 530, and an acquirer computer 528, an issuer computer 532 comprising a financial account database 534, and a game element store server 560 in communication with the payment processing network 530. The game element store server 560 may comprise a game element store module 548 and an account link database 562. A game server 544 may be in communication with the game element store server 560. The game server 544 may comprise a game user account database 546, a game module 550, and an account link database 552. A game client 542, which may be used by the user 510, may be in communication with the game server 544.

The game element store module 548 may offer game elements that are associated with one or more games, game servers 544, or game platforms. The user 510 may purchase game elements from the game element store module.

The account link database 562 may contain information about one or more users 510, one or more game user accounts, one or more financial account identifiers 520, and/or one or more games codes 540. In a preferred embodiment, the account link database may contain a record of the financial account identifier 520, and may associate a game code 540 with the financial account identifier 520. The account link database 562 may associate certain game codes 540 with one or more game servers 544.

As stated above, the account link database 562 at the game element store server 560 may associate the financial account identifier 520 with the game code 520. The account link database 552 at the game server 544 may associate the game code 520 with a game user account. Therefore, the financial account identifier 520 may be associated with a game user account belonging to the user 510. Also, the game server 244 may not have access to the financial account identifier 520 in some embodiments.

Figure 6:
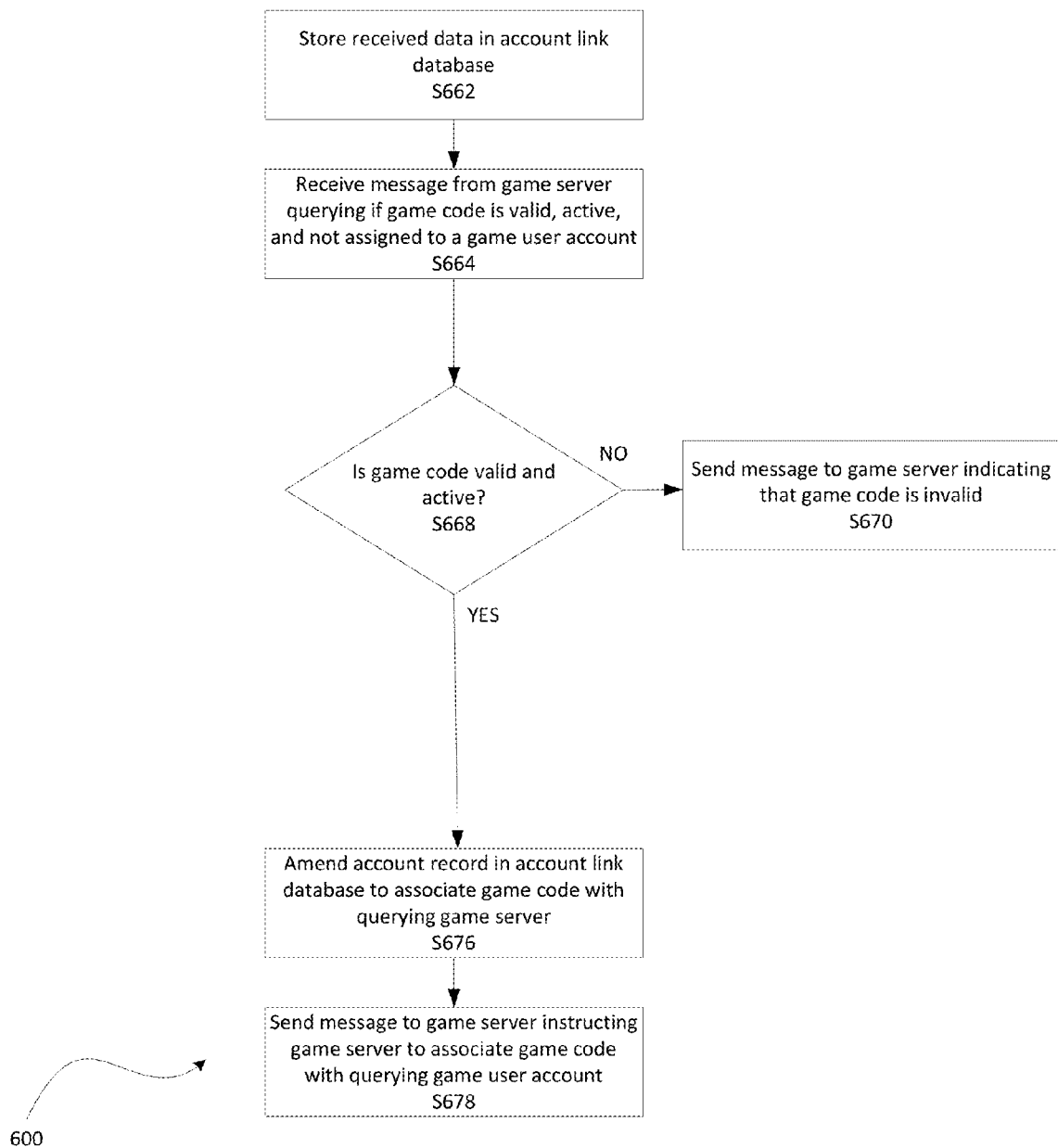
FIG. 6 illustrates an exemplary flow diagram, illustrating steps that may be involved in a registration process of a game code.

FIG. 6 is a flowchart illustrating a method according to an embodiment of the invention. Reference can be made to the system in FIG. 5. The method 600 illustrates a method for associating a game user account with a game element purchasing account.

The user 510 may first receive the portable consumer device 515 comprising the financial account identifier 520. In various embodiments, the user 510 may purchase the portable consumer device 515 from a retail establishment, order it from a game developer or game publisher, order it from a financial institution, or receive it in any other suitable manner.

The financial account identifier 520 and the game code 540 may then be registered at the game element store server 560 in any suitable manner. A record indicating that the financial account identifier 520 and the game code 540 are associated may be stored in the account link database 562. The record may be created and stored when the portable consumer device 515 is first created or first issued.

In step S662, the game element store server 560 may store the received data comprising the game code 540 and the associated financial account identifier 520 in the account link database 562.

The user 510 may then log-in to a game user account stored on the game user account database 546 of the game server 544 using the game client 542. The user 510 may indicate a desire to register the game code 540 with the game server 544. The game server 544 may then prompt the user 510 to provide the game code 540, and the user may then provide the game code 540 to the game client 542, which may then forward the game code 540 to the game server 544.

The game server 544 may wish to verify that the game code 540 is valid, active, and unassigned. The game server 544 may send a message to the game element store server 560 to determine if the game code is valid, active, and unassigned.

In step S664, the game element store server 560 may then receive the message from the game server 540. In response, the game element store server 560 may query the account link database 562.

In step S668, the game element store server 560 may determine if a record of the game code 540 is stored in the account link database 562. If there is no record found of the game code 540, the game element store server 560 may determine that the game code 540 is invalid and/or not active. If a record of the game code 540 is found, the record may indicate that the game code 540 has been activated and is valid, and the game element store server 560 may determine that the game code 540 is active and valid. If, for example, the portable consumer device 515 has not been activated, the account link database 562 may indicate that the game code is inactive. If, for example, the game code 540 has been stolen or compromised in any way, or the game code 540 is not an expected value, the account link database 562 may determine that the game code 540 is invalid.

If, in step S668, the game element store server 560 determines that the game code 540 is not valid or not active, the game element store server 560 may send a message to the game server 544 indicating that the game code 540 is invalid or inactive, as in step S670.

If the game element store server 560 determines that the game code 540 is valid and active, in step S676, the game element store server 560 may update the game code 540 record in the account link database 562 to indicate the querying game server 544. The account link database 562 may indicate that the game code 540 is assigned to the game server 544. As explained above, the account link database 562 may also indicate that the game code 540 is associated with the financial account identifier 520.

In step S678, the game element store server 562 may send a message to the game server 544, and the message may indicate that the game element store server 562 has associated the game server 544 with the game code 540. The message may instruct the game server 544 to associate the game code 540 with the game user account that provided the game code 540.

The game server 544 may then accept the game code 540 provided by the user 510, and register the game code 540 with the game user account of the user 510. The game server 514 may associate the game code 540 with the game user account, and may store a record of the association in the account link database 552. Therefore, in some embodiments, a game user account of the user 510 may be associated with the financial account identifier 520, and the game server 544 may not have access to the financial account identifier 520.

Once the game code 540 is registered with both the game element store server 560 and the game server 544, the user 510 may be allowed to purchase a game element at the game element store server 560, and then the game element may be automatically sent to the game user account at the game server 544.

Figure 7:
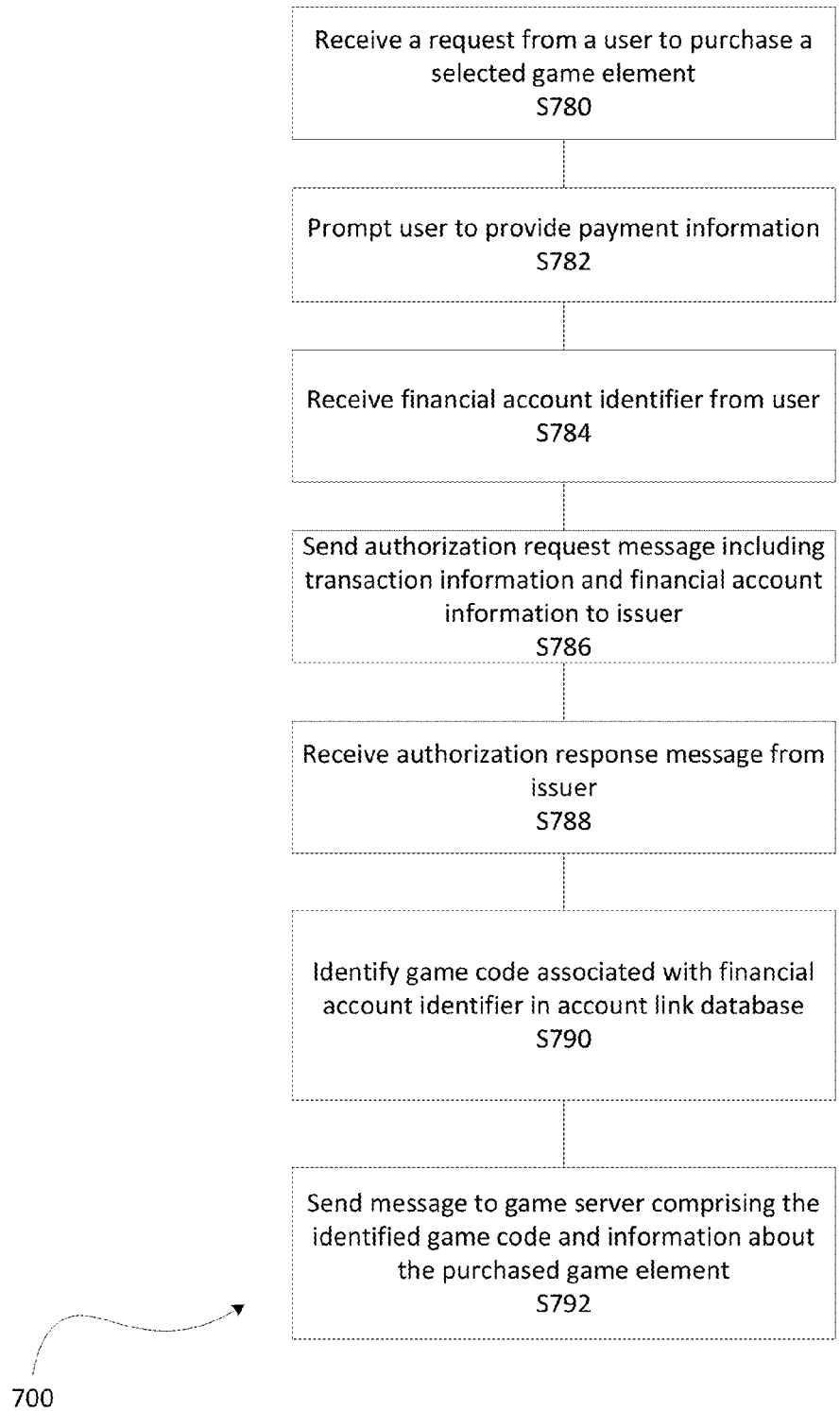
FIG. 7 illustrates an exemplary use case flow diagram for purchasing a game element at a game item store server.

FIG. 7 illustrates an example of how the exemplary system of FIG. 5 described above may provide for purchasing a game element at a game element store server 560 for a game user account at a game server 544.

A user 510, using the game client 542, may browse game elements offered by the game element store server 560 via the game element store module 548. The user 510 may identify and select one or more game elements from the game element store module 548 for purchase, and the user 510 may indicate a desire to purchase the one or more game elements to the game element store server 560.

In step S780, the game element store server 560 may receive the request from the user 510, via the game client 542, to purchase the one or more selected game elements. Before providing the game elements, the game element store server 560 may require payment.

In step S782, the game element store server may prompt the user 510 to provide payment information. In response to the prompt, the user 510 may provide a financial account identifier 520. The user 510 may enter the financial account identifier 520 via a keyboard interface or provide the financial account identifier 520 in any other suitable manner through the game client 202 or through some other client computer.

In step S784, the game element store server 560 may receive the financial account identifier 520 provided by the user 510 if it does not already have it.

In some embodiments, the user 510 may first log-in to a purchasing account with the game element store server 560. The purchase account may be associated with a stored financial account identifier 520 associated with the user 510. The user 510 may not be required to enter the financial account identifier 520 when purchasing a game element, as the game element store server 560 may automatically use the stored financial account identifier 520.

In step S786, the game element store server 560 may generate and send an authorization request message including transaction information and the financial account identifier 520 to the issuer computer 532 associated with the issuer of the financial account represented by the financial account identifier 520. The authorization request message may pass from the game element store server 560 to the issuer computer 532 via the acquirer computer 528 and the payment processing network 530. The transaction information may include the total price of the purchase and the financial account identifier 520.

The issuer computer 532 may receive the authorization request message and may authorize the transaction. The issuer computer 532 may then respond to the authorization request message by sending an authorization response message back to the game element store server 560 via the payment processing network 530 and the acquirer computer 528. In step S788, the game element store server 560 may receive the authorization response message from the issuer computer 532 indicating that the transaction is approved.

The game element store server 560 may then query the account link database 562 and identify a record of the financial account identifier 520 in the account link database 562. The record may include information such as an associated game code 540, an associated game server 544, information about the game elements purchased and/or possessed by the user 510, and any other suitable information.

In step S790, the game element store server 560 may identify a game code 540 and a game server 544 associated with the financial account identifier 520 at the account link database 562.

In step S792, the game element store server 560 may then send a message to the identified game server 544, and the message may comprise the identified game code 540, information about the one or more purchased game elements, and any other suitable information. The game element store server 560 may automatically send the message when game element purchases are made in order to update the game server 544.

The game server 544 may then receive the message from the game element store server 560. The game server 544 may identify the game code 540 included in the message. The game server 544 then may query the account link database 552 to identify a game user account associated with the game code 540. The account link database 552 may contain a record of the game code 540 and one or more game user accounts associated with the game code 540. The game server may determine a game user account associated with the game code 540.

The game server 544 may then attribute the indicated one or more purchased game elements to the game user account. The game server 544 may store the one more purchased game elements in a game element inventory of the game user account. The game element inventory may comprise information about game elements, in-game currency, game status, character attributes, and any other suitable information about the game user account. The game user account may be maintained in the game user account database 546.

The game server 544 may then send a message to the game element store server 560. The message may provide the game element store server 560 with updated information about the game element inventory associated with the game user account. The message may comprise the updated game element inventory information, the game code 540, and any other suitable information.

The game element store server 560 may then receive the message with updated game element inventory information. The game element store sever 560 may store the information in the account link database 562. The information may be associated with the record comprising the game code 540, financial account identifier 520, and game server 544.

The foregoing embodiments may have a number of advantages. For example, the game server need not store payment account numbers. This can be desirable when the store server interacts with many different game servers. Further, in some embodiments, the game server need not process payments, thereby relieving it from the need to create a payment processing infrastructure.

Figure 8:
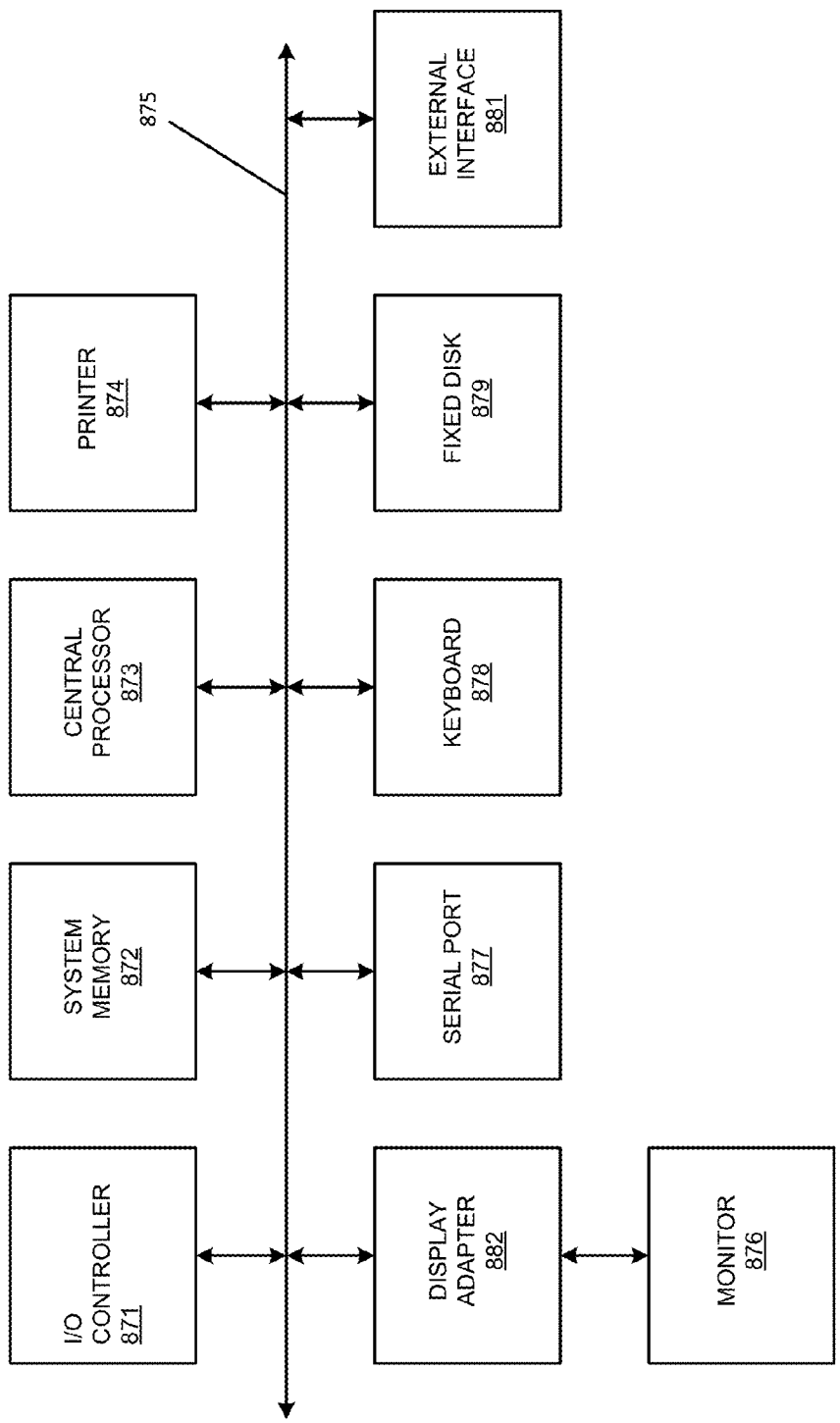
FIG. 8 shows a block diagram of components of a computer apparatus.

The various participants and elements described above may operate one or more computer apparatuses (e.g., a server computer) to facilitate the functions described herein. Any of the elements in FIG. 8 may use any suitable number of subsystems to facilitate the functions described herein. Examples of such subsystems or components are shown in FIG. 8. The subsystems such as a printer 874, keyboard 878, fixed disk 879 (or other memory comprising computer readable media), monitor 876, which is coupled to a display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, can be implemented as software code to be executed by a processor using any suitable computer language such as, for example, Java, C++ or Perl using, for example, conventional or object-oriented techniques. The software code can be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium can reside on or within a single computational apparatus, and can be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a", "an" or "the" is intended to mean "one or more" unless specifically indicated to the contrary.

What is claimed is:

1. A portable consumer device comprising:
    a substrate;
    a financial account identifier on the front of the substrate, wherein the financial account identifier is from an issuer, wherein the financial account identifier is configured to conduct a transaction with a first system, and wherein the first system comprises a payment network;
    a game code on the back of the substrate, wherein the game code is configured to conduct a transaction with a second system that is different from the first system, wherein the second system comprises a game system including an electronic game, wherein the game code represents a value in the electronic game, and wherein the game code is separate from the financial account identifier;
    an electronic or magnetic data storage medium storing at least the financial account identifier; and
    a game graphic that is associated with the electronic game, the game graphic including the name of the electronic game or an icon associated with the electronic game.

2. The portable consumer device of claim 1 wherein the portable consumer device is a prepaid card.

3. The portable consumer device of claim 1, wherein the electronic or magnetic data storage medium includes a magnetic stripe or a memory chip.

4. The portable consumer device of claim 1 wherein the portable consumer device is in the form of a card.

5. The portable consumer device of claim 1 further comprising a removable layer covering the game code.

6. A method comprising:
    receiving, by a user, a portable consumer device, the portable consumer device comprising
        a substrate,
        a financial account identifier on the front of the substrate, wherein the financial account identifier is from an issuer, wherein the financial account identifier is configured to conduct a transaction with a first system, wherein the first system comprises a payment network,
        a game code on the back of the substrate, wherein the game code is configured to conduct a transaction with a second system that is different from the first system, wherein the second system comprises a game system including an electronic game, wherein the game code represents a value in the electronic game, and wherein the game code is separate from the financial account identifier, and
        an electronic or magnetic data storage medium storing at least the financial account identifier;
    selecting, by the user, via a user computer, one or more goods or services for purchase at an online merchant;

providing, by the user, via the user computer, the financial account identifier to the online merchant for purchasing the one or more goods or services;

after providing the financial account identifier, receiving the one or more goods or services;

providing, by the user, via the user computer, the game code to a game server, wherein the game server is separate from the online merchant; and after providing the game code, receiving a game element.

7. The method of claim 6 wherein the financial account identifier represents a financial account at the issuer, and the game code represents a value stored at a game code database.

8. The method of claim 7 wherein the value represented by the game code comprises an amount of real-world currency or game credit that can be used to purchase game elements at a game server.

9. The method of claim 7 wherein the value represented by the game code comprises at least one of an item, an amount of in-game currency, play time, a character attribute, experience points, and access to a game level or game area.

10. The method of claim 7 wherein the financial account identifier and the game code are activated for use after the substrate is received.

11. The method of claim 6 wherein the financial account identifier represents a first value in the first system, and wherein the game code represents a second value in the second system.

12. The method of claim 6 wherein the issuer of the financial account identifier is an issuer bank, and wherein the financial account identifier is a PAN (primary account number).

13. The method of claim 9 wherein the value represented by the game code comprises an item, and wherein the item comprises at least one of a virtual potion and a virtual weapon.

14. The method of claim 7 wherein the payment network is an open-loop payment network, and wherein the online merchant uses the open-loop payment network to determine whether the financial account represented by the financial account identifier is authorized to purchase one or more goods or services.

15. The portable consumer device of claim 1 wherein the financial account identifier represents a first value in the first system, and wherein the game code represents a second value in the second system.

16. The portable consumer device of claim 15 wherein the first value includes a financial account at the issuer, and wherein the second value is stored at a game code database.

17. The portable consumer device of claim 16 wherein the second value comprises at least one of an item, an amount of in-game currency, play time, a character attribute, experience points, and access to a game level or game area.

18. The portable consumer device of claim 1 wherein the issuer of the financial account identifier is an issuer bank, and wherein the financial account identifier is a PAN (primary account number).

19. The method of claim 6, wherein the game element is a virtual weapon, and wherein the virtual weapon is attributed to a game avatar associated with the user.

\* \* \* \* \*